United States Patent [19]

Curry

[11] 4,306,607
[45] * Dec. 22, 1981

[54] TIRE TREAD CUTTING MACHINE

[76] Inventor: Kenneth D. Curry, P.O. Box 1856, Hattiesburg, Miss. 39401

[*] Notice: The portion of the term of this patent subsequent to Feb. 17, 1998, has been disclaimed.

[21] Appl. No.: 137,223

[22] Filed: Apr. 4, 1980

Related U.S. Application Data

[63] Continuation-in-part of Ser. No. 954,726, Oct. 25, 1978, which is a continuation-in-part of Ser. No. 851,966, Nov. 16, 1977, Pat. No. 4,144,923.

[51] Int. Cl.³ .............................................. B29H 21/08
[52] U.S. Cl. ...................................................... 157/13
[58] Field of Search ........................................... 157/13

[56] References Cited

U.S. PATENT DOCUMENTS

| | | | |
|---|---|---|---|
| 2,532,156 | 11/1950 | Errig et al. | 157/13 |
| 2,741,307 | 4/1956 | Meserve et al. | 157/13 |
| 2,765,846 | 10/1956 | Ellis | 157/13 |
| 2,794,503 | 6/1957 | Kraft | 157/13 |
| 2,897,882 | 8/1959 | Barrett | 157/13 |
| 2,986,205 | 5/1961 | Okerstrom | 157/13 |
| 2,995,183 | 8/1961 | Love | 157/13 |
| 3,426,828 | 2/1969 | Neilsen | 157/13 |
| 3,498,356 | 3/1970 | Magers | 157/13 |
| 3,692,081 | 9/1972 | May et al. | 157/13 |
| 4,144,923 | 3/1979 | Curry | 157/13 |

*Primary Examiner*—James G. Smith
*Attorney, Agent, or Firm*—William A. Drucker

[57] ABSTRACT

A tire cutting machine can rotatably support a wheel mounted and inflated tire with the tread thereof facing one or the other, or both, of a groove cutter, and a rotatable siping blade assembled with a lead screw. The tire can be driven by a spiked roller for cutting circumferential grooves, or can be driven by the siping cutter and a lead screw when siping. The siping cutter can be shifted axially of the tire by a motor-driven feed screw with adjustable automatic shut-off.

3 Claims, 8 Drawing Figures

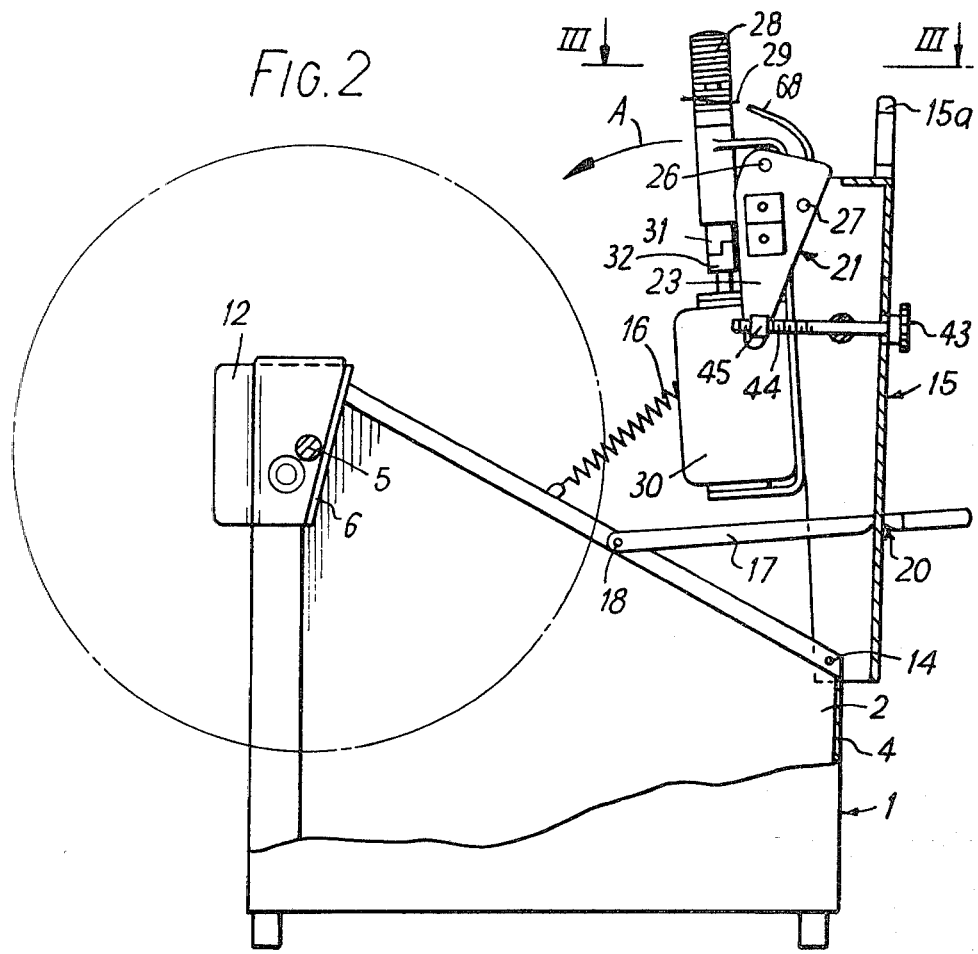
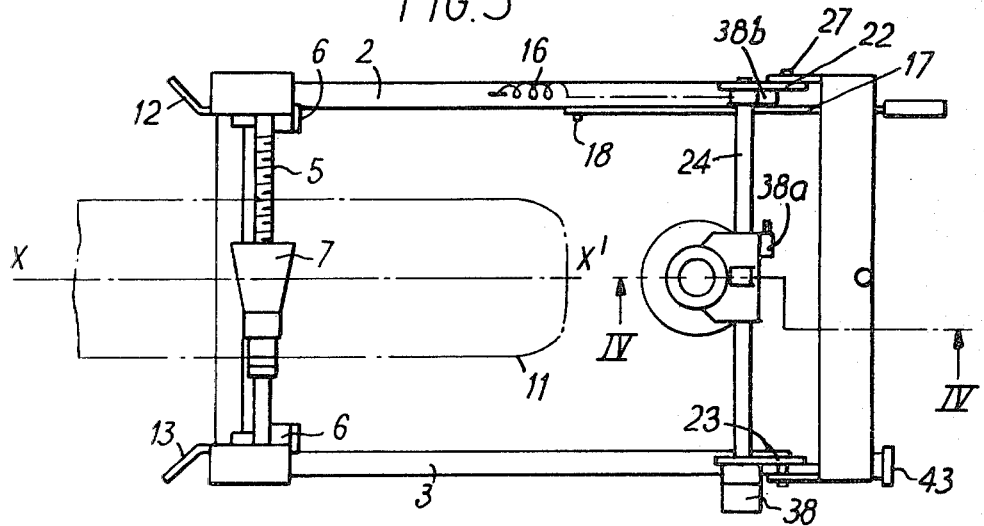

TIRE TREAD CUTTING MACHINE

This application is a continuation-in-part of my co-pending U.S. patent application Ser. No. 954,726 filed Oct. 25, 1978, which is itself a continuation-in-part of my U.S. application Ser. No. 851,966 filed Nov. 16, 1977, which was issued on Mar. 20, 1979 as U.S. Pat. No. 4,144,923.

The present improvements are concerned with a machine for cutting the tread of tires, as by circumferential grooving and/or siping.

OBJECTS OF THE INVENTION

A first object of the present invention is to provide an improved groove cutter for cutting a circumferential groove in a tire by relative rotary movement between the tire and a groove cutter.

A second object of the invention is to provide an improved means for driving a wheel mounted and inflated tire by means of a feed screw, during siping.

A third object of the invention is to provide an improvement in axial shifting of a siping cutter assembly relative to the tire, whereby there is obtained electric motor driven traversing of the siping cutter, with adjustable automatic stop.

SUMMARY OF THE INVENTION

According to a first aspect of these improvements, a machine, for cutting circumferential grooves in a tire tread, comprises:
(i) a support including
(a) means for carrying a tire rotatable about an axis, and
(b) a member positioned radially beyond the tire
(ii) a mounting carried by said support member and adjustable on said support member in the axial direction relative to the tire axis
(iii) a grooving cutter carried by said mounting and adjustable thereon radially with respect to the tire axis, and
(iv) drive means to act between said support and the tire for rotating the tire relative to the grooving cutter.

The support member may include an elongated slotted opening extending parallel to the tire axis, said mounting being secured to said support member by a fastener engaged through said slotted opening, and in a preferred form said grooving cutter is mounted on a stem which is slidable in said mounting radially of the tire axis, a portion of said stem being screw-threaded and having engaged thereon an internally threaded knob for manual adjustment of the grooving cutter radially of the tire axis.

According to a second aspect, a machine, for cutting sipes in a tire tread, comprises:
(i) a support including means for carrying a tire rotatable about an axis,
(ii) bearing means on said support for a shaft rotatable about an axis substantially tangential to said tire axis, said bearing means being adjustable radially with respect to the tire axis,
(iii) a helical siping cutter and a helical lead screw on said shaft, and
(iv) driving means to act between said support and said shaft for rotating said cutter and feed screw.

The bearing means may be movable on said support parallel to said tire axis, and in a preferred form said support includes slide means extending parallel to said tire axis, a lead screw extending parallel to said slide means, a slider slidable on said slide means and engaged as a follower with said lead screw, said slider carrying said bearing means, an electric motor drive on said support coupled to said lead screw for rotating it, a switch on said slider in a current feed circuit for said motor drive, and stop means adjustable along said slide means and securable thereon in any selected position of adjustment to coact with said switch means to break the current feed circuit.

The machine may serve for cutting both circumferential grooves and sipes in a tire tread, and may comprise:
(i) a support including means for carrying a tire rotatable about an axis and a member positioned radially beyond the tire,
(ii) a mounting carried by said support member and adjustable on said support member in the axial direction relative to the tire axis,
(iii) a grooving cutter carried by said mounting and adjustable thereon radially with respect to the tire axis,
(iv) bearing means on said support for a shaft rotatable about an axis substantially tangential to said tire axis, said bearing means being adjustable radially with respect to the tire axis,
(v) a helical siping cutter and a helical lead screw on said shaft, and
(vi) driving means to act between said support and said shaft for rotating said cutter and feed screw.

Further objects of the invention will be partly pointed out in and partly obvious from the following detailed description with respect to the accompanying drawings.

BRIEF DESCRIPTION OF THE DRAWINGS

In the accompanying drawings:

FIG. 2 is a central longitudinal section, with parts shown broken away to reveal internal details;

FIG. 3 is a horizontal section taken at the line III—III of FIG. 2;

DESCRIPTION OF THE PREFERRED EMBODIMENTS

Figure 1:
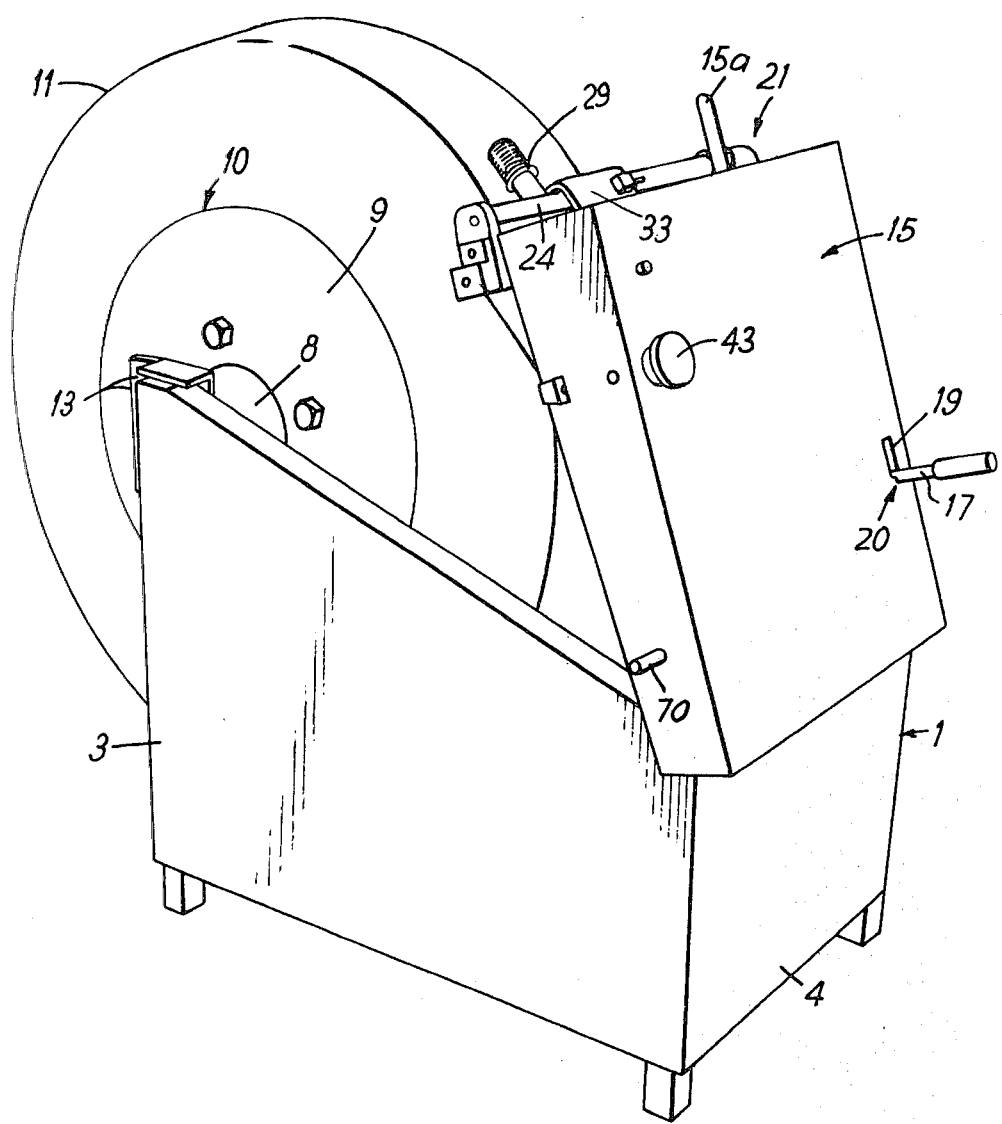
FIG. 1 is a perspective view of a machine adapted for siping only.

The machine comprises a stationary support 1 having opposed spaced parallel side walls 2, 3, and a front wall 4, the rear end being open. Carried by the side walls 2, 3, adjacent the open end and at the upper part of the support there is provided a transverse shaft 5 which sits on blocks 6 so as to be readily removable and replaceable. The shaft 5 carries a frusto-conical sleeve 7 which serves to receive and center a mandrel 8 bolted to the hub 9 of a vehicle wheel 10 having a tire 11. The mandrel is adjustable along the shaft 5 so that the wheel 10 may be positioned with its axial plane of symmetry X—X' substantially centrally in the support. For siping purposes only, the wheel and tire are freely rotatable. On the side walls 2, 3, there are provided flanges 12, 13, which are inclined so as to act as guide for facilitating insertion of the wheel into the support.

On the support, adjacent the upper end of the front wall 4, there is provided on each side wall 2, 3, a pivot 14 carrying a mounting indicated generally by reference numeral 15. A spring 16 is connected at one end to the side wall 2 and at the other end to the mounting 15 to urge the mounting in the direction of the arrow "A" in FIG. 2. The mounting may be releasably latched in a non-operative position, seen in FIG. 2, by means of a latching lever 17, pivoted on the side wall 2 at 18 and protruding through an opening 19 in the mounting 15, the lever 17 having a notch 20 in which the wall of the mounting 15 can be retained. When the lever 17 is raised manually, the wall of the mounting is disengaged from the notch 20 and the mounting 15 is then moved by the spring 16 in the direction of the arrow "A."

On the mounting 15 there is carried a guide frame assembly denoted generally by reference numeral 21. The guide frame assembly comprises a pair of side plates 22, 23, which are rigidly connected in spaced parallel relationship by an upper slide tube 24 and a lower slide tube 25 which are secured to the side plates by bolts 26. The frame assembly as a whole is mounted on the mounting 15 by a respective pivot 27 at each side engaged through the side plate and a side wall portion of the mounting 15, and can be moved with the aid of a handle 15a.

Figure 4:
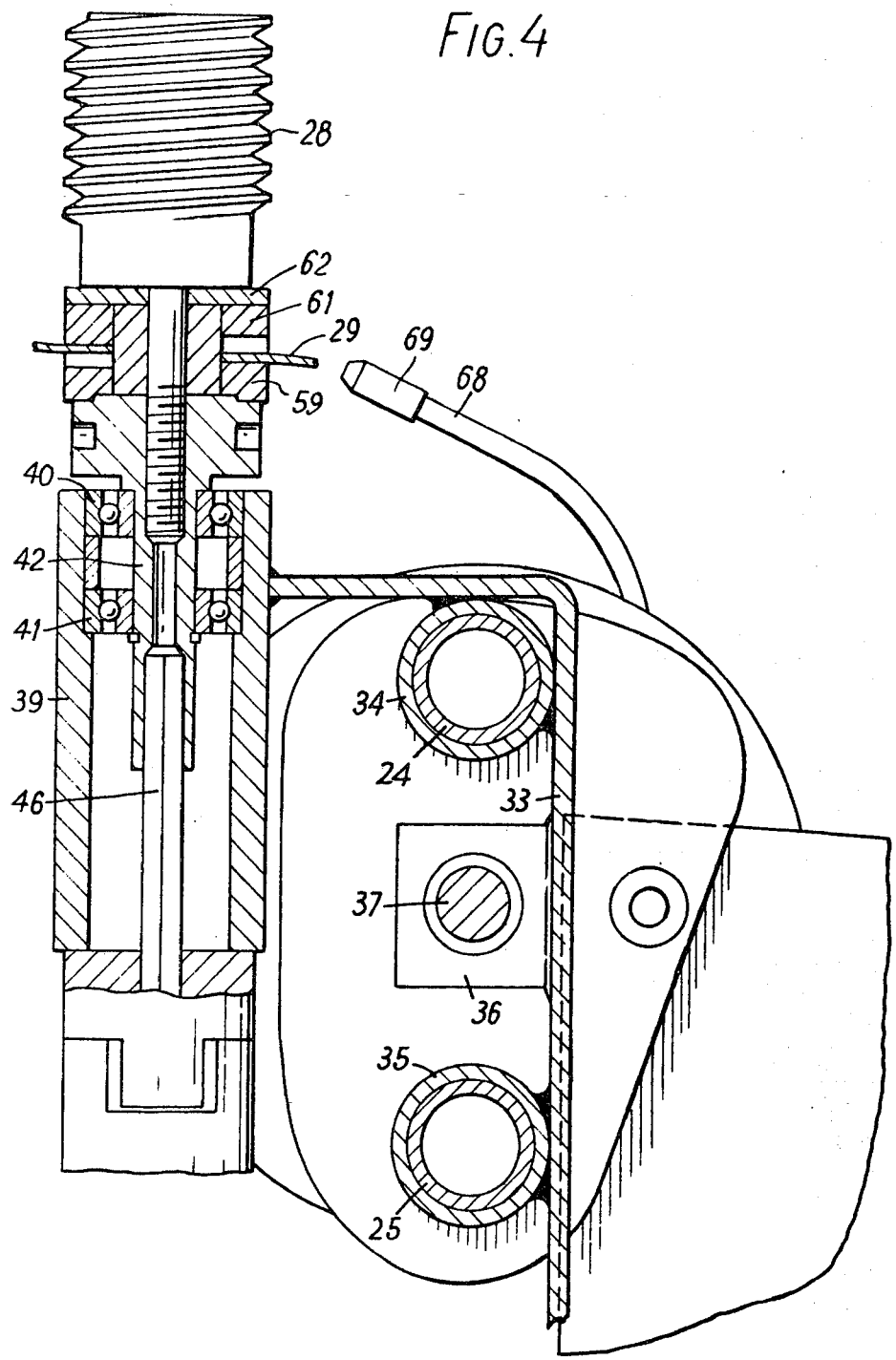
FIG. 4 is a scrap vertical section taken on the line IV—IV of FIG. 3.

On the upper and lower slide tubes 24, 25, there is carried an assembly of a rotary lead screw 28, a rotary siping cutter 29, and an electrical driving motor 30 for the cutter coupled by dog clutch elements 31, 32. Referring to FIG. 4, this assembly includes a bracket 33 on which are welded sleeves 34, 35 which respectively slide on the upper and lower slide tubes 24, and 25. For shifting the assembly along the slide tubes there is provided a block 36 which is secured to the bracket 33 and which is internally threaded and is engaged on a threaded lead screw 37 journalled in the side plates 22, 23, of the mounting 15. The lead screw 37 is rotated manually by means of a reduced-speed electric motor 38 mounted at one end of the lead screw and coupled thereto by a ratchet drive device (not shown).

The electric motor 38 is under the control of a snap switch 38a which is adapted to be put into "off" position when it contacts an adjustable end-stop 38b which can be slid along the upper slide tube 24 and then locked in a selected position of adjustment.

On the upper part of the bracket 33 there is welded a sleeve 39 having ball races 40, 41, for a cutter shaft 42 carrying the cutter 29 which will be described hereinbelow in greater detail with reference to FIG. 5. The lower part of the bracket 33 has secured thereon the electric motor 30 coupled through the dog clutch 31, 32, to a shaft 46 secured in the cutter shaft 42.

Figure 5:
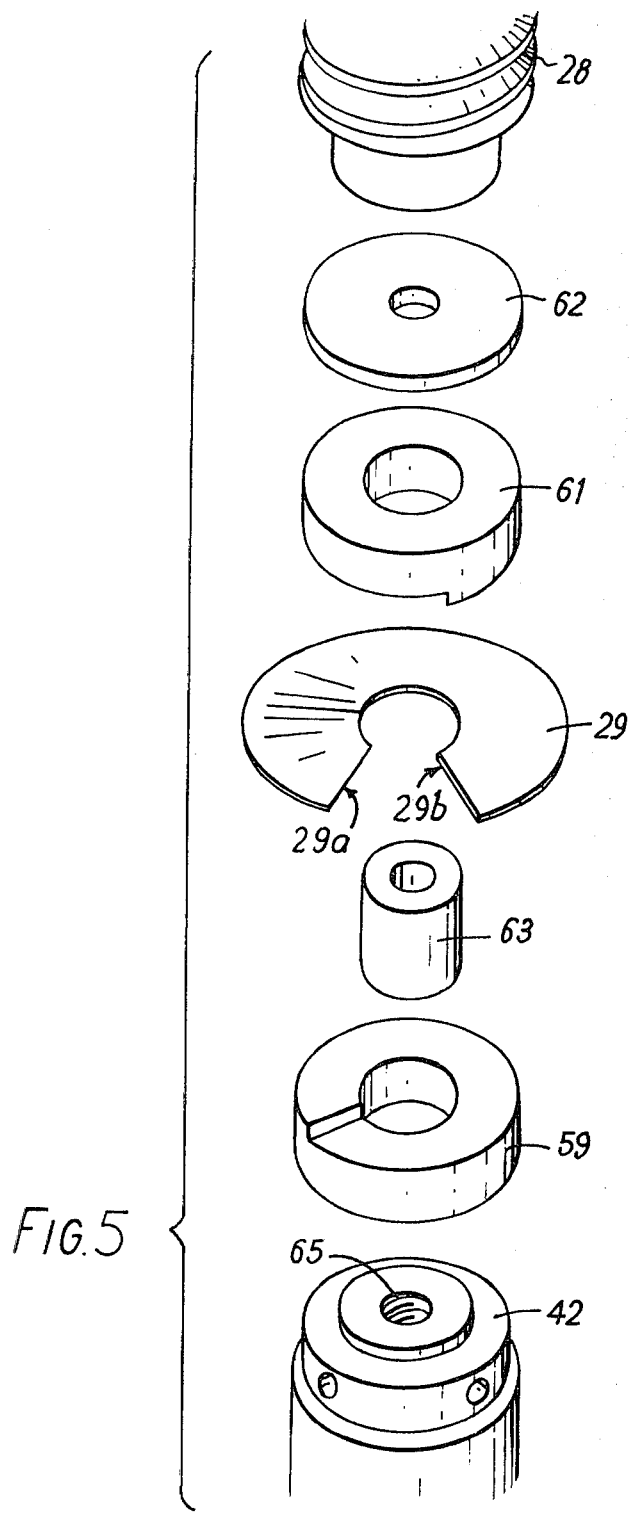
FIG. 5 is a perspective view, with the elements shown in axially separated condition, of a cutter head assembly, with lead screw omitted.

Referring now to FIG. 5, the rotatable cutter has the cutter shaft 42, a lower clamping block 59 to seat on the shaft 42, the helical cutter blade 29, an upper clamping block 61, a washer 62, a centering sleeve 63 to seat within the two blocks and the blade, and the helical feed screw 28, the whole being held in assembly by a screw (not shown) engaged into a threaded bore 65 in the shaft 42. The blade is helical and accordingly one end 29a is axially offset from the other end 29b, the two blocks 59 and 61 being appropriately cut away to conform to the shaping of the blade.

The operation of the machine when used for tire siping is as follows:

A vehicle wheel with its tire is mounted on the shaft 5 and is adjusted so that its center line X—X' is substantially central in the support 1. With the mounting 15 in the non-operative position of FIG. 2, the cutter assembly is adjusted laterally until the axis of the cutter blade 29 is aligned with a first one of the usual several sections of tread which occur taken across the tire in order.

Then the latching lever 17 is released to permit the lead screw 28 and cutter 29 to rest stationarily against the tire tread. The handwheel 43 is then rotated to rotate threaded shaft 44 in nut 45 (see FIG. 2) to adjust the position of the guide frame assembly 21 so as to place the axis of rotation of the cutter blade 29 at a true tangential position in relation to the circumference of the tire thread section. The motor 30 is then switched on to cause the cutter blade to rotate and cut the tread section. Due to the helical nature of the lead screw 28 and of the cutter blade, at each time of rotation the tire is pulled around by a circumferential increment of movement corresponding to the degree of axial offset of the two edges of the cutter blade. Accordingly, as cutting proceeds, the tire rotates until the entire tread section has been cut. The motor is then switched off, and the cutter assembly is adjusted laterally until the cutter is aligned with the next tread section, again with adjustment of the tangential position. The motor 30 is again energised to rotate the cutter and cut the section of tread. These operations are repeated until all the sections of tread have been cut. When the last section of tread has been cut, the motor is switched off, and the mounting 15 is pulled manually back to the non-operative position and is latched therein by the lever 17. The wheel and tire are removed, and a fresh wheel and tire can be inserted.

A pipe 68 is mounted on the bracket 33 and has a jet nozzle 69 adjacent the cutter blade for supplying a lubricating liquid to the cutter. An inlet conduit union 70 for the liquid supply is provided on the support.

Figure 6:
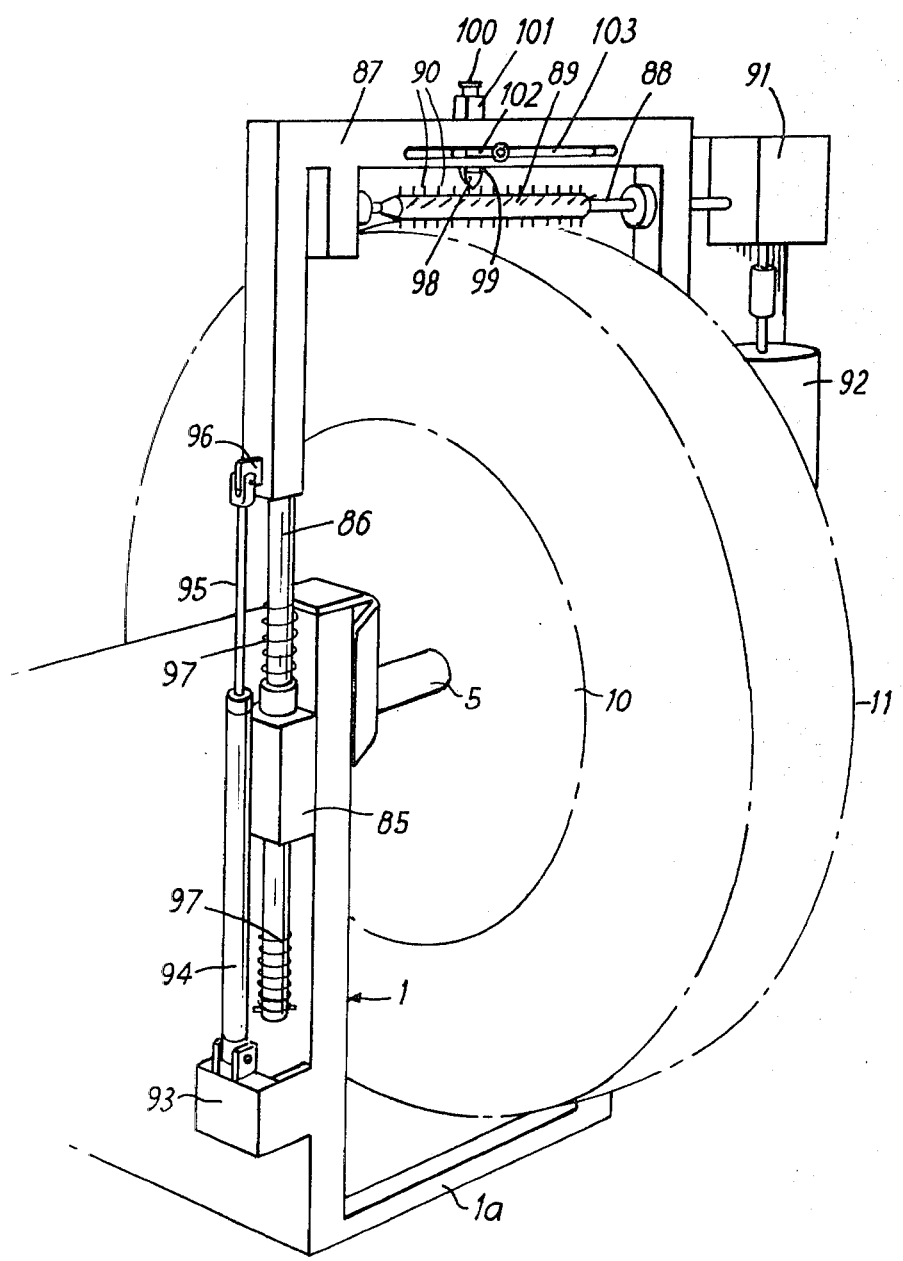
FIG. 6 is a partial perspective elevation to show details of means for direct drive engagement of the tire when the circumferential groove cutter is to be used on the tire.

Referring now to FIG. 6, there are shown details of a means for direct drive of the tire when the grooving cutter is to be used.

At an end of the support 1, on each of the side walls 2, 3, there is mounted a slide block 85 in which is vertically slidable a rod 86, the two rods carrying at their upper end an inverted U-shaped frame 87. In the frame 87 there is journalled a transverse drive shaft 88 which has an integral roller portion 89 with radial spikes 90 adapted to bite into the tread of the tire 11 and give position drive engagement. The shaft 88 is connected through a speed reduction gear box 91 to an electrical drive motor 92. On each side wall 2, 3, there is mounted a bracket 93 on which is coupled a cylinder 94 of a hydraulic or pneumatic ram, the piston rod 95 of the ram being connected to a lug 96 on the frame 87. The cylinders 94 of the rams at each side of the machine are coupled by common piping (not shown) to a conventional hand-operable pump, with release valving. Coiled springs 97 are provided on the rod 86, above and below the block 85 to reduce shock when the rams reach the ends of their stroke. When the machine is being used for siping, the rams are actuated to maintain the frame 87 at an increased height such that the spikes 90 are clear of the tire tread. When the machine is to be used for cutting of circumferential grooves, using the U-shaped cutter described below, the rams are actuated to permit lowering of the frame 87 to give positive drive between the spiked roller 89 and the tread of the tire.

Figure 7:
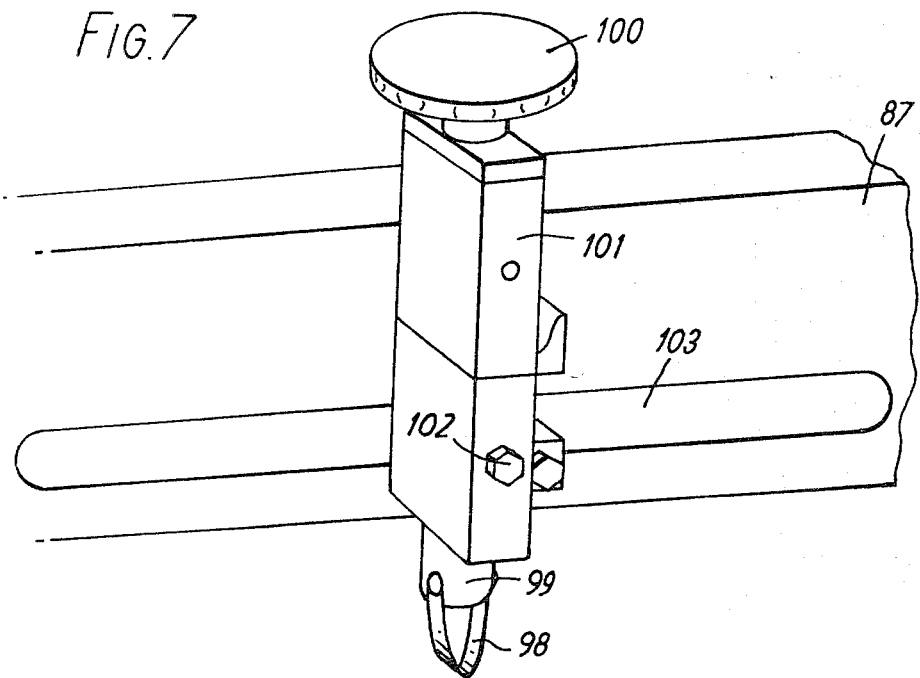
FIG. 7 is a partial perspective elevation of a groove cutter, on a larger scale.
Figure 8:
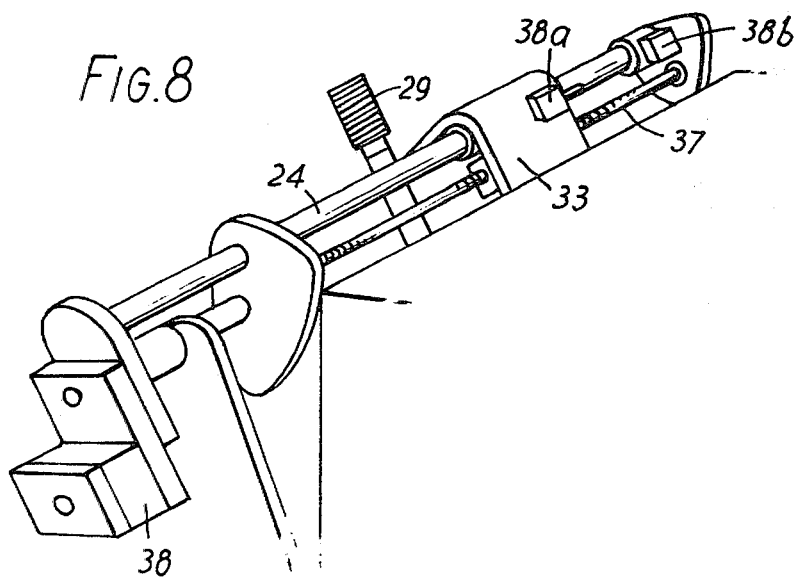
FIG. 8 is a perspective of traversing means.

Referring now to FIGS. 6 and 7, there is shown a U-shaped or V-shaped groove cutter 98 carried on a stem 99 which can be adjusted vertically, i.e. radially with respect to the tire, by means of a knurled knob 100 threaded onto a threaded portion of the stem 99, the latter being slidable in a mounting 101 which is secured to the cross-piece of the frame 87 by a bolt 102 passed through an elongated slot 103 in the frame 87. By releasing the bolt 102, the entire assembly 98, 99, 100, 101, can be adjusted axially of the tire, and then the bolt is tightened again. The depth of cut of a groove in the tire is controlled by adjustment of the knob 100.

The term "siping" as used herein is to indicate the formation of a shallow cut or slash laterally of the tread and a satisfactory siping of a tire is accomplished by forming about eight shallow slashes to the running inch, for example, in a tread section completely across the tread, but at a depth in the tread so that the cuts are almost invisible unless said tread is flexed.

When siped tires are used on a vehicle running on a dry road, the narrow rubber ribs of the tread between the siper slashes therein easily buckle and flex over sharp bumps and pits with less strain on the tire sidewalls so that the tire carcass life is extended. When the siped tires are used on ice or rain-slick roads, the tread bends at each tiny slash formed by the siping, forming a saw-toothed surface or squeegee-edged rubber ribs, which gives enhanced traction.

Also a siped tire resists skidding and jack-knifing on fast stops of the vehicle as each rubber rib of the crosscut tread bends back and its squeegee-shaped edge grabs the road.

I claim:

1. A machine for cutting circumferential grooves and sipes in a tire tread, which comprises:
   (i) a support including hub means for carrying a tire rotatable about an axis of the hub and a member positioned radially beyond the tire,
   (ii) a mounting carried by said support member and adjustable on said support member in the axial direction relative to the tire axis,
   (iii) a grooving cutter carried by said mounting and adjustable thereon radially with respect to the tire axis,
   (iv) bearing means on said support for a shaft rotatable about an axis substantially tangential to said tire axis, said bearing means being adjustable radially with respect to the tire axis,
   (v) a helical siping cutter and a helical feed screw on said shaft, and
   (vi) driving means to act between said support and said shaft for rotating said cutter and feed screw.

2. A machine for cutting sipes in a tire tread, which comprises:
   (i) a support including hub means for carrying a tire rotatable about an axis of the hub means,
   (ii) bearing means on said support for a shaft rotatable about an axis substantially tangential to said tire axis, said bearing means being movable on said support parallel to said tire axis and being adjustable radially with respect to the tire axis,
   (iii) a helical siping cutter and a helical feed screw on said shaft, and
   (iv) driving means to act between said support and said shaft for rotating said cutter and feed screw.

3. A machine, as claimed in claim 2, wherein said support includes slide means extending parallel to said tire axis, a lead screw extending parallel to said slide means, a slider slidable on said slide means and engaged as a follower with said lead screw, said slider carrying said bearing means, an electric motor drive on said support coupled to said lead screw for rotating it, a switch on said slider in a current feed circuit for said motor drive, and stop means adjustable along said slide means and securable thereon in any selected position of adjustment to coact with said switch means to break the current feed circuit.

* * * * *